United States Patent
Enyedy et al.

(10) Patent No.: US 9,731,371 B2
(45) Date of Patent: Aug. 15, 2017

(54) ENGINE DRIVE WITH ELECTRODE STORAGE

(71) Applicant: LINCOLN GLOBAL, INC., City of Industry, CA (US)

(72) Inventors: Edward A. Enyedy, Eastlake, OH (US); Badri Narayanan, Mayfield Heights, OH (US); Paul E. Denney, Bay Village, OH (US); Steven R. Peters, Huntsburg, OH (US)

(73) Assignee: Licoln Global, Inc., Santa Fe Springs, CA (US)

( * ) Notice: Subject to any disclaimer, the term of this patent is extended or adjusted under 35 U.S.C. 154(b) by 377 days.

(21) Appl. No.: 14/309,253

(22) Filed: Jun. 19, 2014

(65) Prior Publication Data
US 2015/0367439 A1 Dec. 24, 2015

(51) Int. Cl.
*B23K 9/26* (2006.01)
*B23K 9/10* (2006.01)

(52) U.S. Cl.
CPC .................. *B23K 9/1006* (2013.01)

(58) Field of Classification Search
CPC ........... B23K 9/26; B23K 9/1006; B23K 9/10
USPC ...... 219/72, 74, 75, 130.1, 133, 136, 137 R, 219/137.7
See application file for complete search history.

(56) References Cited

U.S. PATENT DOCUMENTS

2006/0124761 A1* 6/2006 Shank ..................... B05B 9/002
239/13
2007/0034426 A1 2/2007 Akamatsu et al.
2009/0101630 A1* 4/2009 Trinkner .............. B23K 9/1006
219/133
2014/0246413 A1* 9/2014 Rozmarynowski .. B23K 9/1006
219/137 PS

FOREIGN PATENT DOCUMENTS

| GB | 1157968 A | * | 7/1969 | ............... B23K 9/32 |
| GB | 2044655 A | * | 10/1980 | ............... B23K 9/26 |
| IT | EP 1247609 A2 | * | 10/2002 | ............... B23K 9/32 |
| JP | 2007220637 A | | 8/2007 | |
| JP | 2009057933 A | | 3/2009 | |
| JP | 2010244946 A | | 10/2010 | |
| JP | 20100251219 A | | 11/2010 | |
| KR | 20120026809 A | | 3/2012 | |

OTHER PUBLICATIONS

NPL "Low-Hydrogen Stick Electrodes: Getting to the Basics"; Jul. 30, 2013. Dowloaded from http://www.hobartbrothers.com/index. php?mact=News,cntnt01,print,0&cntnt01articleid=154 &cntnt01showtemplate=false&cntnt01returnid=523 on Nov. 7, 2016.*

* cited by examiner

*Primary Examiner* — Thien S Tran
(74) *Attorney, Agent, or Firm* — Brad Spencer

(57) ABSTRACT

The subject innovation relates to engine driven welding systems and methods regulating an environmentally controlled electrode compartment within storage constraints to maintain electrode integrity regardless of environmental factors outside the container. Various sensors and controllers which directly or indirectly provide input to the engine of the engine driven welder are used to facilitate such regulation, which is conducted at least in part using the engine itself.

17 Claims, 10 Drawing Sheets

ENGINE DRIVE WITH ELECTRODE STORAGE

TECHNICAL FIELD

The invention described herein pertains generally to systems and methods for storing welding electrodes in an environmentally controlled compartment contained in the welder.

BACKGROUND OF THE INVENTION

The capability to conduct welding operations and the quality of resulting welds is frequently a product not only of the welding apparatus, but also the conditions under which the weld is produced. Ambient temperature, humidity, the presence of contaminants, and other variables can impact the structural integrity and/or aesthetics of a completed weld.

In this respect, one consequence of undesirable environmental parameters is electrode degradation. Many electrodes are packaged in impermeable materials after production to ensure no degradation occurs until they are opened by an end user. However, depending on environmental factors, the quality of electrodes may begin to degrade immediately upon opening. Welders are therefore faced with a limited window of time in which to use the electrodes, and risk wasting electrodes that are unused before degradation occurs.

To combat waste, some welders have taken to using ovens to store electrode material removed from its original packaging. However, the ovens are unwieldy and frequently stored a distance from the actual welding operation, causing lost time and inconvenience to the users.

SUMMARY OF THE INVENTION

In accordance with the present invention, there is provided an engine driven welding system, comprising: an engine of the engine driven welding system that drives a rotor of a rotor-stator assembly generating electrical energy used in a welding operation; an environmentally controlled electrode storage compartment configured to enclose one or more electrodes used in the welding operation; an electrode storage compartment sensor that detects one or more environmental parameters within the environmentally controlled storage compartment; an engine controller that selectively controls at least one engine operation parameter based at least in part on the one or more environmental parameters; and an environmental control component that controls the one or more environmental parameters within the environmentally controlled electrode storage compartment at least in part using the at least one engine operation parameter.

In accordance with the present invention, there is provided a method that includes at least the following steps: monitoring the one or more environmental parameters using a sensor to produce sensor feedback; comparing the sensor feedback to one or more storage constraints; generating a control signal based on the sensor feedback within the electrode storage compartment; controlling an engine of the engine driven welder increasing or decreasing engine output based on the control signal; modifying the one or more environmental parameters of the electrode storage compartment based on the increasing or decreasing engine output.

In accordance with the present invention, there is provided a welding device that includes at least the following: means for performing a welding operation; means for storing one or more electrodes associated with the welding operation within the means for performing the welding operation; means for monitoring one or more environmental parameters of the means for storing; means for generating a control signal based on the one or more environmental parameters; means for controlling the one or more environmental parameters based on the control signal.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

The subject innovation relates to engine driven welding systems and methods for regulating an environmentally controlled electrode compartment within storage constraints to maintain electrode integrity regardless of environmental factors outside the container. Various sensors and controllers which directly or indirectly provide input to the engine of the engine driven welder are used to facilitate such regulation, which is conducted at least in part using the engine itself. The environmentally controlled electrode storage compartment can be integral with the welder itself, providing users of the welder a self-contained system permitting mid- to long-term storage of unpackaged electrodes with the welder to increase efficiency and convenience in welding operations.

Figure 1:
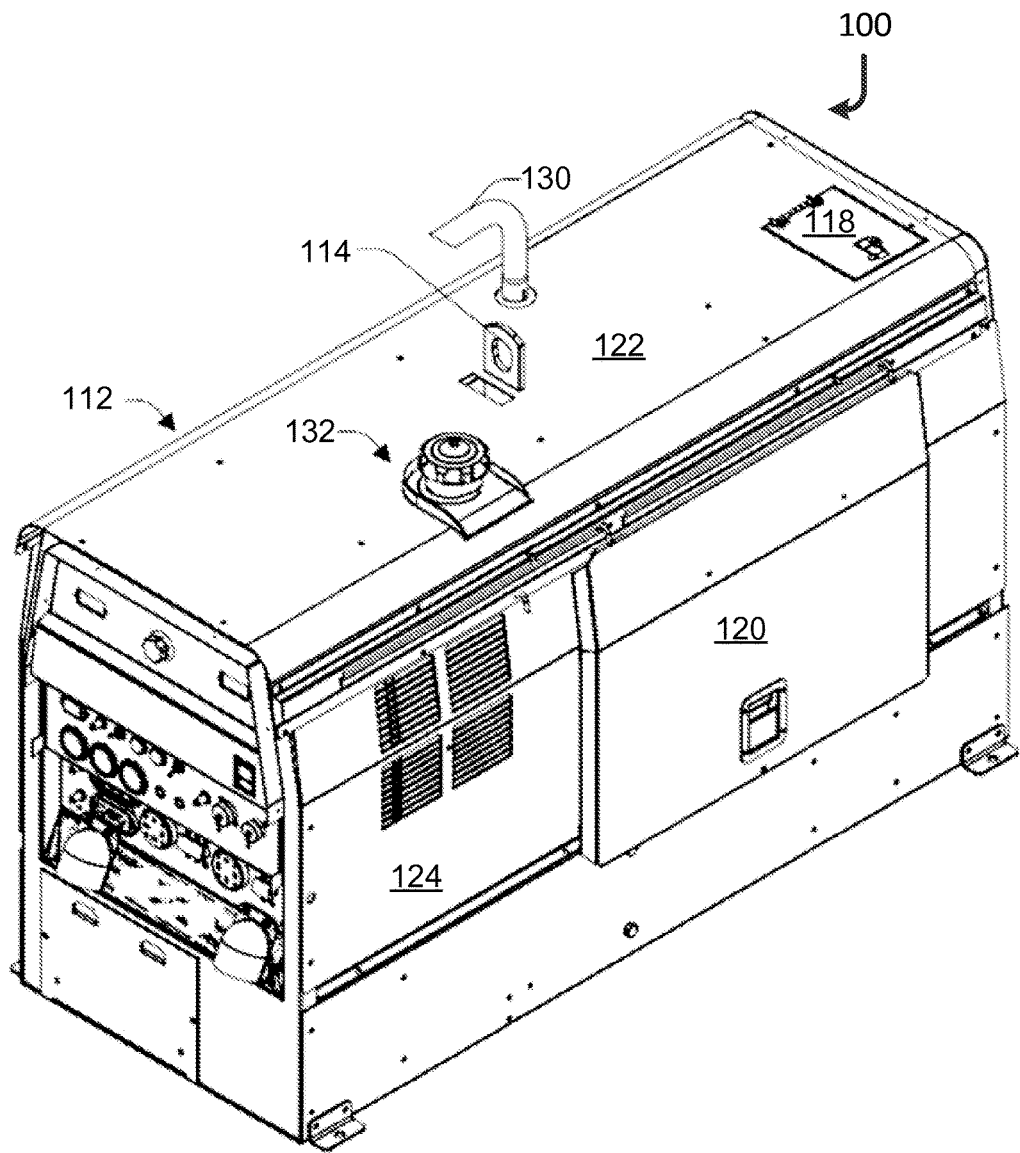
FIG. 1 is a diagram illustrating a welding device that includes a motor as a power source.
Figure 2:
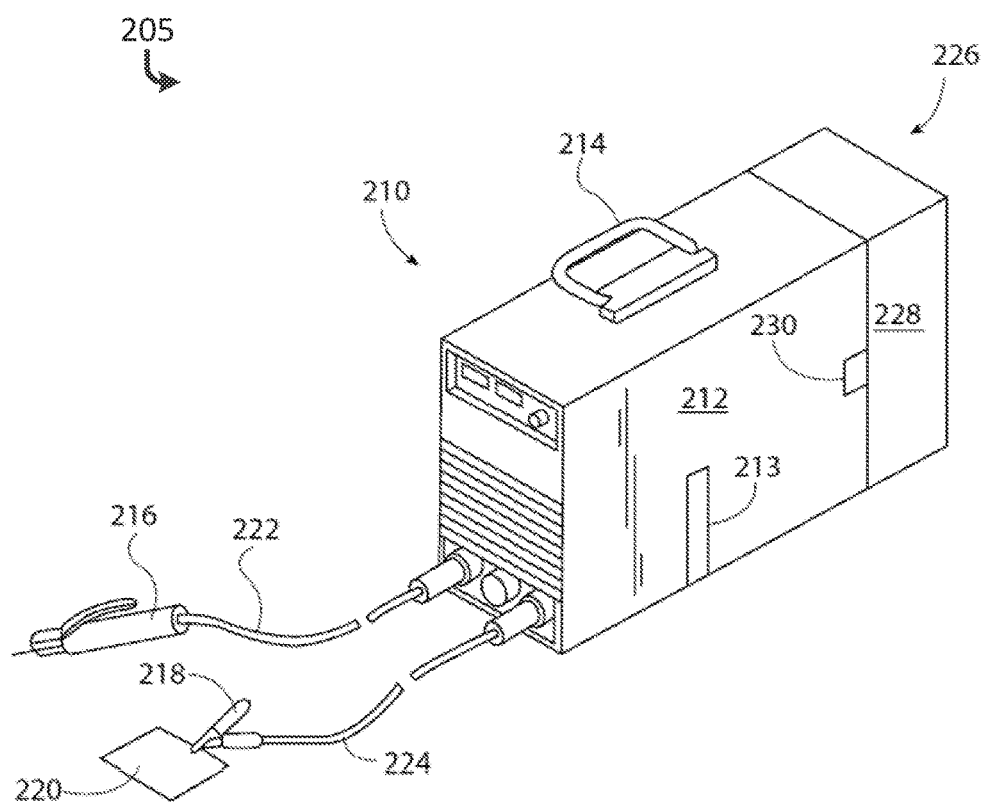
FIG. 2 is a diagram illustrating a welding device.
Figure 3:
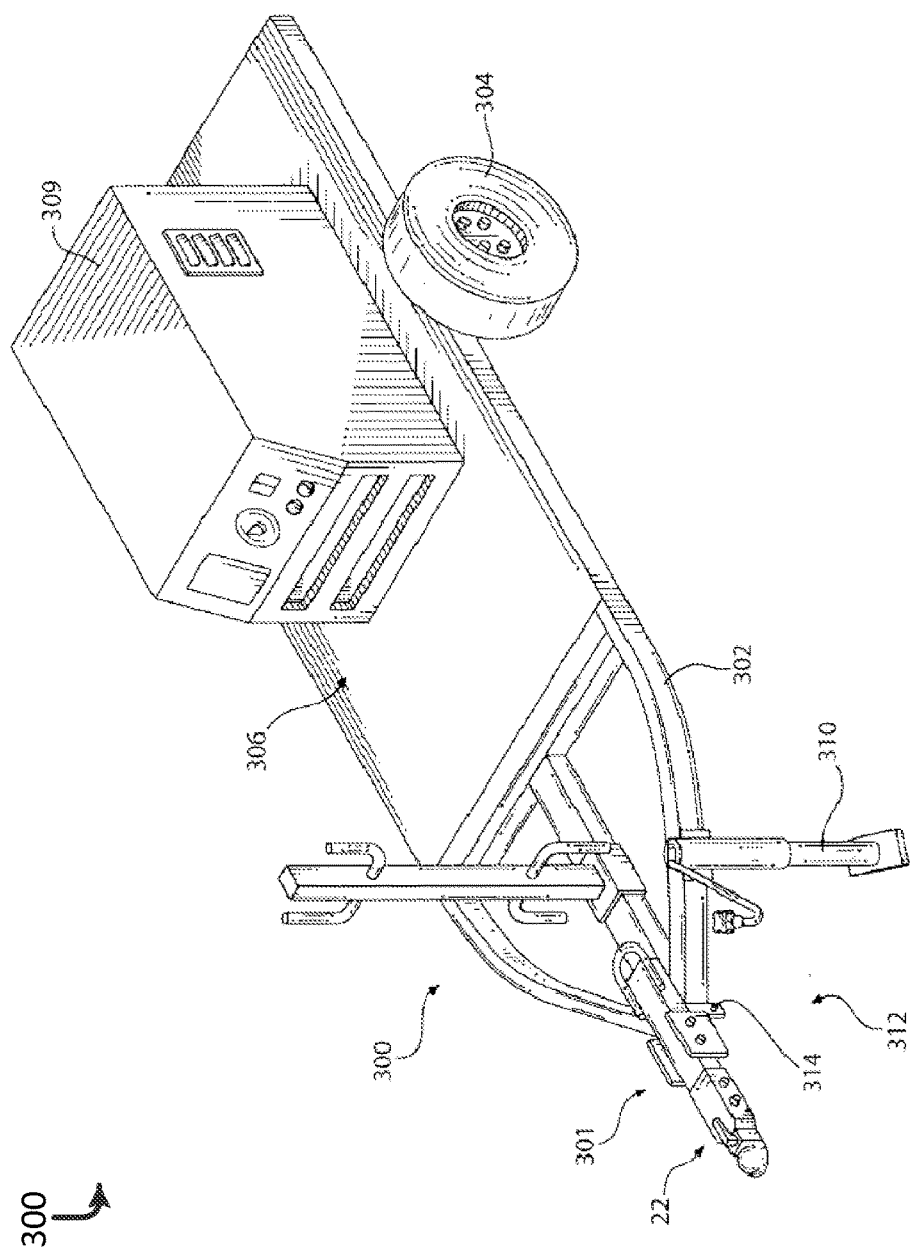
FIG. 3 is a diagram illustrating a welding device affixed to a trailer for mobility.

The subject innovation can be used with any suitable engine-driven welder, engine-driven welding system, engine-driven welding apparatus, a welding system powered by an engine, a welding system powered by an energy storage device, others not expressly listed, and/or combinations thereof. It is to be appreciated that any suitable system, device, or apparatus that can perform a welding operation can be used with the subject innovation and such can be chosen with sound engineering judgment without departing from the intended scope of coverage of the embodiments of the subject invention. The engine driven welder can include a power source that can be used in a variety of applications where outlet power is not available or when outlet power will not be relied on as the sole source of power including portable power generation, backup power generation, heating, plasma cutting, welding, and gouging. The example discussed herein relates to welding operations, such as, arc welding, plasma cutting, and gouging operations. It is to be appreciated that a power source can generate a portion of power, wherein the portion of power is electrical power. It is to be appreciated that "power source" as used herein can include a motor, an engine, a generator, an energy storage device, a component that creates electrical power, a component that converts electrical power, or a combination thereof. By way of example and not limitation, FIGS. 1-3 illustrate welding systems or devices that can be utilized with the subject innovation. It is to be appreciated that the following welding systems are described for exemplary purposes only and are not limiting on the welding systems that can utilize the subject innovation or variations thereof.

FIG. 1 illustrates a welding device 100. The welding device 100 includes a housing 112 which encloses the internal components of the welding device. Optionally, the welding type device 100 includes a loading eyehook 114 and/or fork recesses. The loading eyehook 114 and the fork recesses facilitate the portability of the welding device 100. Optionally, the welding-type device 100 could include a handle and/or wheels as a means of device mobility. The housing 112 also includes a plurality of access panels 118, 120. Access panel 118 provides access to a top panel 122 of housing 112 while access panel 120 provides access to a side panel 124 of housing 112. A similar access panel is available on an opposite side. These access panels 118, 120, provide access to the internal components of the welding device 100 including, for example, an energy storage device (not shown) suitable for providing welding-type power. An end panel includes a louvered opening to allow for air flow through the housing 112.

The housing 112 of the welding-type device 100 also houses an internal combustion engine. The engine is evidenced by an exhaust port 130 and a fuel port 132 that protrude through the housing 112. The exhaust port 130 extends above the top panel 122 of the housing 112 and directs exhaust emissions away from the welding-type device 100. The fuel port 132 preferably does not extend beyond the top panel 122 or side panel 124. Such a construction protects the fuel port 132 from damage during transportation and operation of the welding-type device 100.

Referring now to FIG. 2, illustrated is a perspective view of a welding apparatus 205 that can be utilized with the subject innovation. Welding apparatus 205 includes a power source 210 that includes a housing 212 enclosing the internal components of power source 210. As will be described in greater detail below, housing 212 encloses control components 213. Optionally, welding device 210 includes a handle 214 for transporting the welding system from one location to another. To effectuate the welding process, welding device 210 includes a torch 216 as well as a grounding clamp 218. Grounding clamp 218 is configured to ground a workpiece 220 to be welded. As is known, when torch 216 is in relative proximity to workpiece 220, a welding arc or cutting arc, depending upon the particular welding-type device, is produced. Connecting torch 216 and grounding clamp 218 to housing 212 is a pair of cables 222 and 224, respectively.

The welding arc or cutting arc may be generated, at times or in part, by the power source by conditioning raw power received from an interchangeable energy storage device 226. Energy storage device 226 is encased in a housing 228. Housing 228 is securable to the housing of welding device 210 thereby forming welding-type apparatus 205. Specifically, energy storage device 226 is secured to power source 210 by way of a fastening means 230. It is contemplated that fastening means 230 may include a clip, locking tab, or other means to allow energy storage device 226 to be repeatedly secured and released from power source 210.

FIG. 3 illustrates a trailer 300 incorporating a trailer hitch or hitching device, depicted generally at 301. The trailer 300 may include a trailer frame 302 and one or more trailer wheels 304 in rotational connection with the trailer frame 302 and may further include a payload region 306 for carrying one or more cargo items, which in an exemplary manner may be a welding power supply 308 or an engine driven welding power supply 308. The trailer 300 may also include an adjustable stand 310 for adjusting the height of the front end 312 of the trailer 300. However, any means may be used for raising and/or lowering the front end 312 of the trailer 300. The trailer hitch 301 may be a generally longitudinal and substantially rigid trailer hitch 301 and may be attached to the frame 302 via fasteners 314, which may be threaded bolts.

Embodiments for carrying out the invention will now be described for the purposes of illustrating example configurations known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 4-7 illustrate a block diagram of a welding device, and in particular, an engine driven welding device as discussed in FIGS. 1-3.

Figure 4:
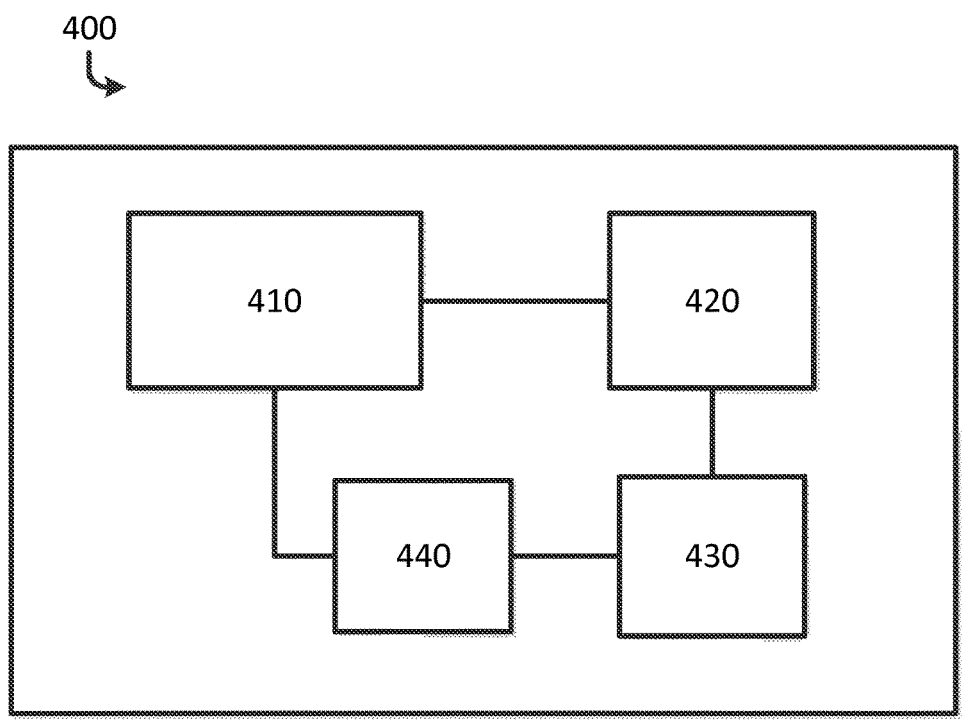
FIG. 4 is a block diagram illustrating a welding device that includes an environmentally controlled electrode storage compartment.

Turning to FIG. 4, welding device 400 illustrated as a block diagram includes engine 410 used to generate power for engine-driven welding operations performed by welder 400. Engine 410 can be any engine used in engine-driven welding operations, and in embodiments can include multiple modes of operation or be regulated to accord with various regulations (e.g., limited to 25 horsepower).

Environmentally controlled electrode storage compartment 420 is operatively coupled with engine 410 and welding device 400. In at least one embodiment, environmentally controlled electrode storage compartment 420 is contained within the same case or structure as engine 410, and is within welding device 400. In alternative embodiments, environmentally controlled electrode storage compartment 420 can be located outside the case of welding device 400, but is proximate to welding device 400 such that the two are operatively coupled and can communicate fluidly and/or electrically through direct physical connections (e.g., conduits, wires).

Environmentally controlled electrode storage compartment 420 is configured to retain at least one electrode for use in conjunction with a welding operation performed by welding device 400. In embodiments, at least one electrode stored within environmentally controlled electrode storage compartment 420 can be a low-hydrogen consumable electrode requiring storage below a maximum humidity or above a minimum heat during certain periods to avoid contamination by atmospheric hydrogen. In alternative or complementary embodiments, at least one electrode stored within environmentally controlled electrode storage compartment 420 can be a cellulosic electrode requiring storage above a minimum moisture content to avoid "over-drying" of the electrode. Various different electrodes or electrode-types (e.g., material, size) can be stored within environmentally controlled storage compartment simultaneously.

In one or more embodiments, environmentally controlled electrode storage compartment 420 can include two or more distinct compartments regulated to separate environmental parameters. For example, two different electrode types may be regulated to different environmental parameters in order to optimize parameters for both electrode types, or to provide energy required to maintain appropriate parameters for a first electrode type without utilizing excess energy for a second electrode type which can be maintained at lower-energy parameters (e.g., lower temperature, higher humidity).

Environmentally controlled electrode storage compartment 420 can include one or more electrode holders. Electrode holders can include any structure for arranging or maintaining the orientation or positioning of electrodes within the environmentally controlled electrode storage compartment 420. For example, electrode holders can include compartment partitions, shelves, hooks, cylinders, clamps, flexible members that can be adjusted (e.g., buttoned, zipped, snapped), and other fixtures to prevent different types of electrodes from commingling or moving freely within the environmentally controlled electrode storage compartment 420. In one or more embodiments, magnets can be employed to fix electrodes or associated elements in place within environmentally controlled electrode storage compartment 420.

Environmentally controlled electrode storage compartment 420 can further include various access openings, inlets, and outlets. One or more compartment closures can be used to access the space within environmentally-controlled electrode storage compartment 420 and electrodes stored therein. In embodiments, connections between environmentally controlled electrode storage compartment 420 and other components can be configured to open or close (e.g., to enable or disable particular environmental control effects). Additionally, embodiments can incorporate one or more one-way valves which release vapors during periods of increased heat or pressure, but re-seal as pressure drops, thereby storing the electrodes under at least partial vacuum.

Welding device 400 also includes electrode storage compartment sensor 430. Electrode storage compartment sensor 430 can include one or more sensors to detect and monitor environmental parameters within or related to environmentally controlled electrode storage compartment 420. Electrode storage compartment sensor 430 can include one or more sensors for monitoring or detecting, for example, temperature, humidity, various chemical substances, et cetera. Electrode storage compartment sensor 430 can be distributed as having several point-sensors, or one single sensor in a central or other location within environmentally controlled electrode storage compartment 420.

Electrode storage compartment sensor 430 provides sensor feedback related to the environmental parameters associated with environmentally controlled electrode storage compartment 420. Sensor feedback can be used by logic associated with electrode storage compartment sensor 430 to facilitate control of engine 410, various outputs of which can be used in regulating the environmental parameters of environmentally controlled electrode storage compartment 420.

Welding device 400 further includes controller 440 which controls at least a portion of the operation of engine 410. Controller 440 receives information related to the environmental parameters sensed by electrode storage compartment sensor 430 either directly from electrode storage compartment sensor or via an intervening logic/electronic component. Based on the environmental parameters, controller 440 can engage, disengage, throttle up, throttle down, or otherwise modify operation of engine 410 (e.g., engage "compartment mode" for controlling environmental parameters but not for use during welding operations) to influence environmental parameters associated with environmentally controlled electrode storage compartment. Such action can be accomplished using, for example, a control signal. The environmental parameters can be controlled with outputs from engine 410 (e.g., exhaust, coolant, other byproduct heat, blown air, generated electricity, et cetera).

To determine appropriate operation of engine 410 required to drive the environmental parameters to desired values or within desired ranges, the sensed environmental parameters can be compared to environmental storage constraints. The environmental storage constraints can be values or ranges of temperatures, humidities, chemical contents (e.g., parts per million), and/or values or ranges for lengths of time (e.g., 45% humidity for 2 hours, 55% humidity for 90 minutes), and/or assessments of electrode quality (e.g., percent degradation based on detected or observed measurement). In some embodiments, example constraints can include maintaining a temperature of the environmentally controlled electrode storage container 420 above 350 degrees Fahrenheit, 400 degrees, Fahrenheit, or 450 degrees Fahrenheit.

Depending on the amount by which the sensed environmental parameters differ from the environmental storage constraints, or the length of time over which the sensed environmental parameters have differed from the environmental storage constraints, electrode quality, et cetera, engine 410 can be driven to correct environmental parameters to the storage constraint values or ranges. For example, one of electrode storage compartment sensor 430, controller 440, or another component can generate one or more control signals based on the comparison of the sensed environmental parameters and the storage constraints.

As suggested, one or more timing components can be integrated with electrode storage sensor component 430, controller 440, or other components. The timing component(s) can track lengths of time during which electrodes are stored under given environmental parameters. This can provide "count downs" to modification of operation of engine 410 based on the length of time under certain conditions until electrodes will become degraded under the environmental parameters.

In generating the control signal or otherwise modifying operation of engine 410, various techniques can be employed to improve the accuracy of control. For example, in embodiments, models or statistics from previous activity can be used to determine appropriate control measures. The models and/or statistics can be pre-programmed, or updated based on ongoing use (e.g., learning/adaptive system). Alternatively, a continuous feedback system can be employed which steers behavior of engine 410 (and/or other components) to manage environmental parameters associated with environmentally controlled storage compartment 420.

The models, statistics, or control techniques can be based on one or more variables in addition to the sensed environmental parameters. For example, other variables such as external temperature, external humidity, engine temperature, electrode composition, electrode size, the quantity of electrodes stored in environmentally controlled electrode storage compartment 420 (e.g., 25% full, 75% full), and other values which may influence the environmental parameters, or rate of change of environmental parameters, associated with environmentally controlled electrode storage compartment 420.

Controller 440 (or another logic component) may further perform scheduling in accordance with various control techniques herein. For example, based on an expected or provided length of a welding operation, changing environmental conditions (e.g., air temperature, humidity), a fuel amount (e.g., amount remaining in tank for welding device 400), and other parameters, various schedules for controlling engine 410 can be developed ahead of time or on-the-fly in anticipation of regulating environmental parameters associated with environmentally controlled storage compartment 420. For example, based on rising outside (air) temperature, it can be determined that causing engine 410 to run at a period of time early in the rising temperature period will move the environmental parameters within environmentally controlled storage compartment 420 into the upper end of the storage constraints, and therefore obviate the need for later engine running. This can facilitate preservation of fuel and result in a more efficient use of welding device 400 and its associated resources. Modification of environmental constraints can be scheduled around normal operation of welding device 400 (e.g., welding operations) for similar purposes. Such possibilities are only presented as examples, and more complex scheduling (assessing multiple possibilities over longer periods of time) can be undertaken to ensure storage constraints are maintained to arrive at more efficient solutions for enforcing storage constraints.

In embodiments, environmentally controlled electrode storage compartment 420 can include an electrode type sensing component. Such a component may sense or detect the composition, size, or other parameters of one or more electrodes stored in environmentally controlled electrode storage compartment 420. Various means for determining the type of electrode can be employed, including (but not limited to) optical recognition means (e.g., cameras and image processing logic assessing various optical characteristics such as reflectivity, pattern, microscopic analysis, et cetera), electrical recognition means (e.g., conductivity), mechanical recognition means (e.g., weight, size), chemical recognition means (e.g., surface or remote detection of chemical composition), and others. An electrode type signal can be generated based on the sensed electrode type. The electrode type signal can be used to define the storage constraints to ensure that the proper constraints are maintained for electrode integrity.

In embodiments, other intervening components can facilitate the influence of engine 410 on environmentally controlled electrode storage compartment 420. For example, mechanical or electrical conducts can be opened or closed by other apparatuses which are powered by common means, or through distinct or separate sources. Conduits or circuits can be opened or closed, and material (e.g., fluid, gas) or electricity pushed or modified between engine 410 and environmentally controlled electrode storage compartment 420.

Figure 5:
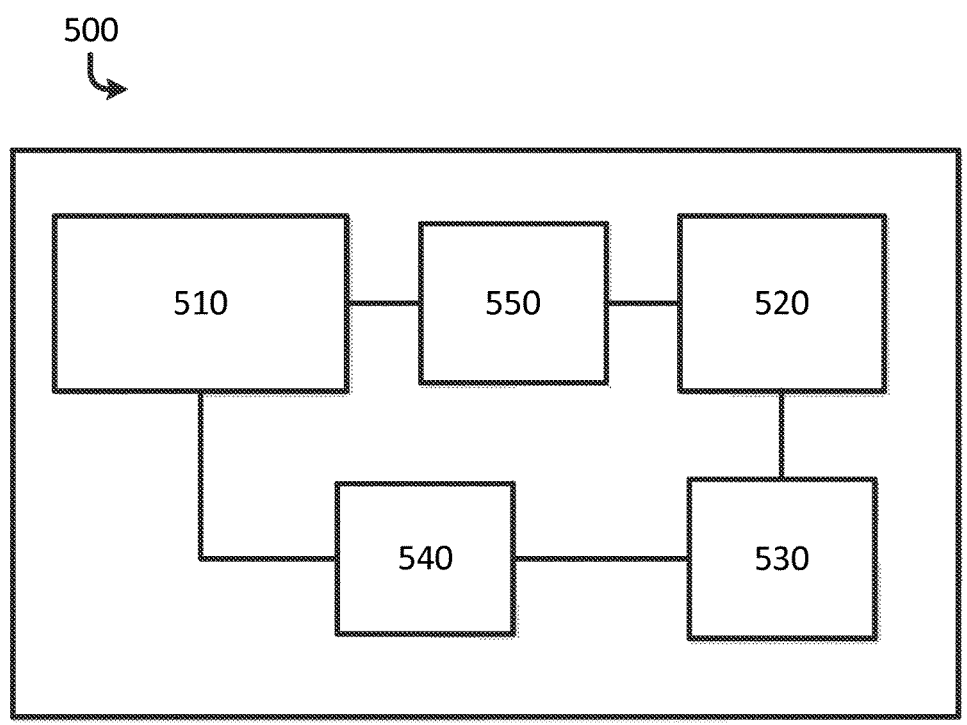
FIG. 5 is a block diagram illustrating a welding device that includes an environmentally controlled electrode storage compartment controlled at least in part using an exchanger.

Illustrated in FIG. 5, welding device 500 includes engine 510, environmentally controlled electrode storage compartment 520, electrode storage compartment sensor 530, and controller 540. Controller 540 can control engine 510 to cause modification of environmental parameters in environmentally controlled electrode storage compartment 520 based at least in part on information from electrode storage compartment sensor 530.

Welding device 500 further includes exchanger 550. In embodiments, exchanger 550 is a heat exchanger designed to route heat produced as a byproduct of operation of engine 510 through at least a portion of environmentally controlled electrode storage compartment 520 to influence environmental parameters therein.

In at least one embodiment, exchanger 550 includes a heat exchanger that utilizes exhaust from engine 510. Exhaust from engine 510 may be produced and expelled at temperatures above the air temperature, and may therefore be applied to heat components (e.g., at least a portion of environmentally controlled electrode storage compartment 520) with which storage constraints must be maintained. In alternative or complementary embodiments, exchanger 550 may utilize exhaust which can also be used to dehumidify environmentally controlled electrode storage compartment 520 (e.g., based on the exhaust having a lower moisture content than non-exhaust air in environmentally controlled electrode storage compartment 520) or to change the chemical content of the air in environmentally controlled electrode storage compartment 520 (e.g., where low-hydrogen consumable electrodes are stored exhaust can increase carbon monoxide content and therefore reduce the presence of hydrogen).

Figure 6:
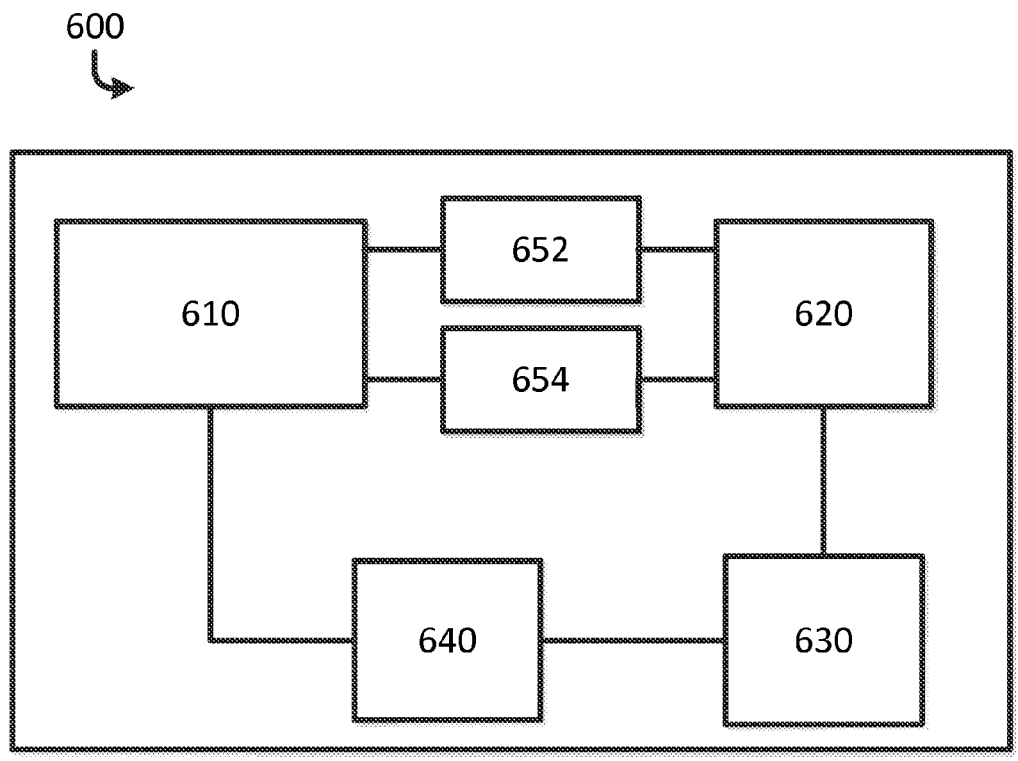
FIG. 6 is a block diagram illustrating a welding device that includes an environmentally controlled electrode storage compartment controlled at least in part using exchangers for exhaust and coolant.

Turning now to FIG. 6, this drawing illustrates in block form welding device 600 having engine 610, environmentally controlled electrode storage compartment 620, electrode storage compartment sensor 630, and controller 640. Controller 640 can control engine 610 to cause modification of environmental parameters in environmentally controlled electrode storage compartment 620 based at least in part on information from electrode storage compartment sensor 630. FIG. 6 illustrates an embodiment where two separate exchanger processes can be utilized to control environmental parameters in environmentally controlled electrode storage compartment 620.

Coolant exchanger 652 receives coolant having an elevated temperature from operation of engine 610, and routes the heated coolant through conduits proximate to environmentally controlled electrode storage compartment 620 to elevate the temperature of environmentally controlled electrode storage compartment 620. In embodiments, coolant may also be exchanged from other sources which operate at high temperatures within welding device 600.

Exhaust exchanger 654 receives exhaust having an elevated temperature, humidity, or chemical composition desirable for controlling environmental parameters of environmentally controlled electrode storage compartment 620.

Coolant exchanger 652 and exhaust exchanger 654 can be utilized independently or simultaneously based on storage constraints related to one or more electrodes contained in environmentally controlled electrode storage compartment 620. In embodiments, one of coolant exchanger 652 and exhaust exchanger 654 can be utilized until a process for controlling at least one environmental variable using the one of coolant exchanger 652 and exhaust exchanger 654 is "maxed out," whereby the environmental parameter cannot be further influenced in the desired direction using the process for controlling the at least one environmental variable. At this time, another process using the other of coolant exchanger 652 and exhaust exchanger 654 can be employed to continue influencing the environmental parameter in the desired fashion. In embodiments, a logic component (e.g., controller 640) can determine whether another process can further influence the environmental parameters in the desired fashion before enabling the other process. In some alternative or complementary embodiments, where multiple processes for controlling environmental parameters can be utilized, a most efficient process can be selected (e.g., exhaust exchanger 654 may require less power to run than coolant exchanger 652) for use before other processes for managing environmental parameters.

Figure 7:
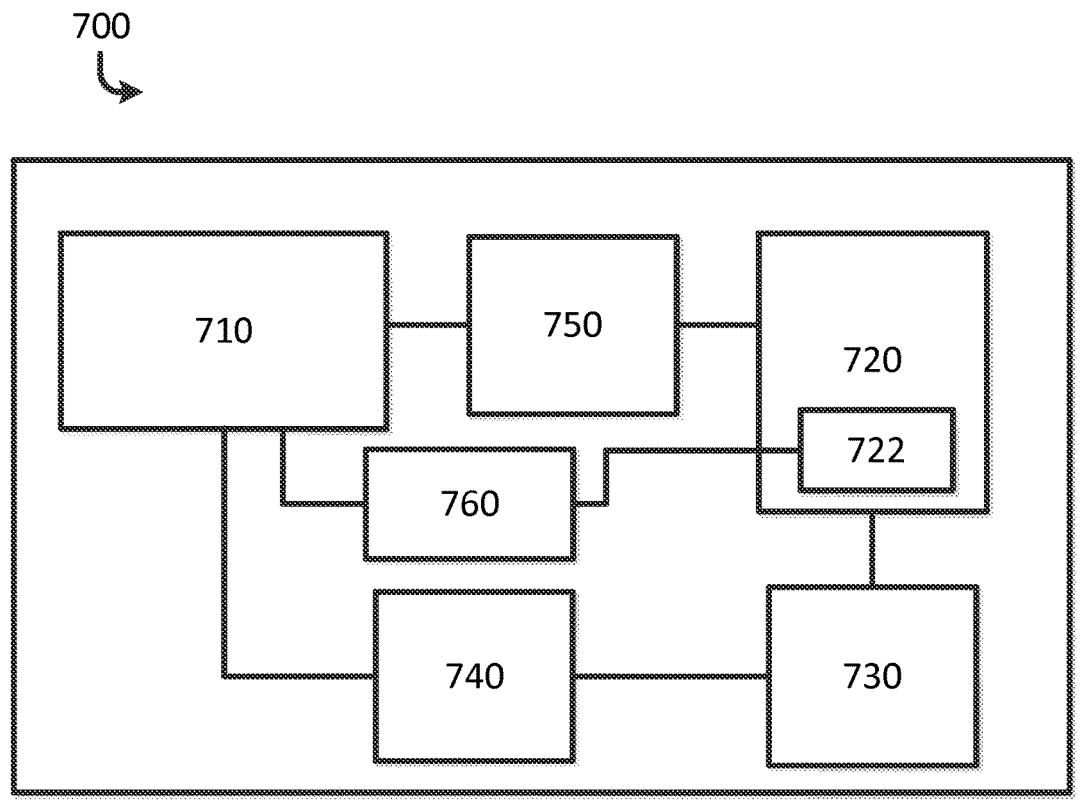
FIG. 7 is a block diagram illustrating a welding device that includes an environmentally controlled electrode storage compartment controlled at least in part using an exchanger which can be supplemented by an electric heater.

FIG. 7 depicts welding device 700. Welding device 700 includes engine 710, environmentally controlled electrode storage compartment 720, electrode storage compartment sensor 730, and controller 740. Controller 740 can control engine 710 to cause modification of environmental parameters in environmentally controlled electrode storage compartment 720 based at least in part on information from electrode storage compartment sensor 730. Exchanger 750 can be an exchanger (e.g. heat or other exchanger using exhaust, coolant, or other energy sources) utilized to control environmental parameters within environmentally controlled electrode storage compartment 720.

FIG. 7 also includes electrical bus 760 which is connected to electrical control component 722. Electrical bus 760 may be the electrical bus used by welding device 700 to provide electrical power for welding, or may be a separate electrical bus. In embodiments of a separate electrical bus, electrical bus 760 may receive power generated by the same rotor-stator used by the main welding electrical bus, a separate generator apparatus, or another power supply (e.g., battery, connection to another electrical power source).

Electrical control component 722 is a component within or acting on environmentally controlled electrode storage compartment 720 to control environmental parameters associated therewith. In at least one embodiment, electrical control component 722 can be an electric heater which directly or radiantly heats environmentally controlled electrode storage component 720 and/or electrodes therein. In alternative or complementary embodiments, electrical control component can be a dehumidifier, a humidifier, vent, blower, cooler, air conditioning unit, or other electrically-powered component used in controlling environmental parameters in environmentally controlled electrode storage compartment 720. Two or more electrical control components (e.g., heater and dehumidifier) can be utilized in a single embodiment without departing from the scope or spirit of the innovation.

Electrical control component 722 can be used alone or in combination with exchanger 750 in management of environmental parameters associated with environmentally controlled electrode storage compartment 720. As discussed above in relation to FIG. 6, various distinct processes can be employed to influence environmental parameters. Electrical control component 722 can be used as one such process, and can be optimized, scheduled, or selected for use independently or with other processes to ensure storage constraints are maintained and/or other variables are optimized.

Environmentally controlled electrode storage compartment 720 can further include a one-way valve or similar component for use in conjunction with electrical control component 722. In this fashion, when electrical control component 722 and/or other components are modifying environmental parameters, air or other contaminants having undesired characteristics can be vented. Once electrical control component 722 (or other components such as exchanger 750) ceases operation, the exterior environment is sealed without further action required by an operator or additional automated component. In embodiments where environmentally controlled electrode storage compartment 720 is heated or pressurized, this can result in environmentally controlled electrode storage compartment 720 being sealed under partial vacuum as the pressure drops consequent to control components de-energizing.

Figure 8:
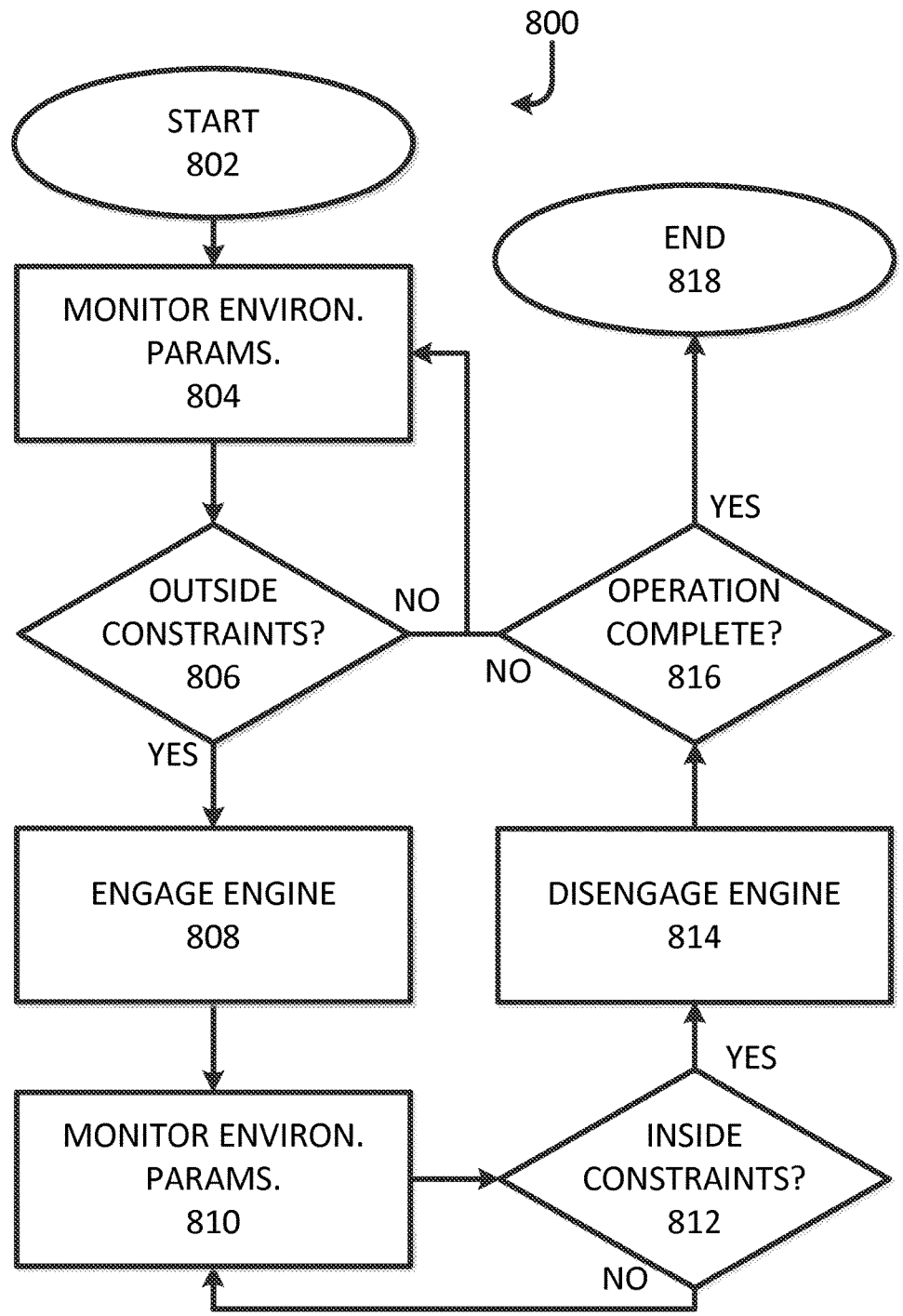
FIG. 8 is a flow diagram of a methodology for controlling environmental parameters in an environmentally controlled electrode storage compartment.

Turning now to FIG. 8, illustrated is a methodology 800 for controlling environmental parameters in an environmentally controlled electrode storage compartment. Methodology 800 starts at 802 and proceeds to 804 where environmental parameters associated with the environmentally controlled electrode storage compartment are monitored. Monitoring can occur in an ongoing, real-time fashion, or based on periodic audits to preserve energy or based on device capability. At 806 a check is performed to determine if one or more of the environmental parameters being monitored are outside the storage constraints (e.g., above or below point value, beyond prescribed range, past a threshold). If the determination at 806 returns negative, methodology 800 recycles to 804 where monitoring continues.

If the determination at 806 returns positive, the engine is engaged at 808 and a process for influencing the environmental parameters back into accord with the storage constraints is begun. Thereafter at 810, the parameters are monitored to evaluate when the environmental parameters are brought into conformance with the storage constraints. At 812, methodology 800 performs a check as to whether the process initiated at 808 has brought the environmental parameters into accord with the storage constraints. If, at 812 it is determined that the environmental parameters remain outside the storage constraints, methodology 800 returns to 810 and monitoring continues.

If the determination at 812 returns positive, methodology 800 proceeds to 814 where the engine is disengaged (or the control process associated with the engine is ceased in the event the engine is still running in support of a welding operation). Thereafter, a determination is made at 816 to resolve whether the operation maintaining storage constraints is complete. If the operation is incomplete, methodology 800 returns to 804 where monitoring of the environmental parameters continues. However, if the operation is complete, methodology 800 proceeds to terminate at 818.

Figure 9:
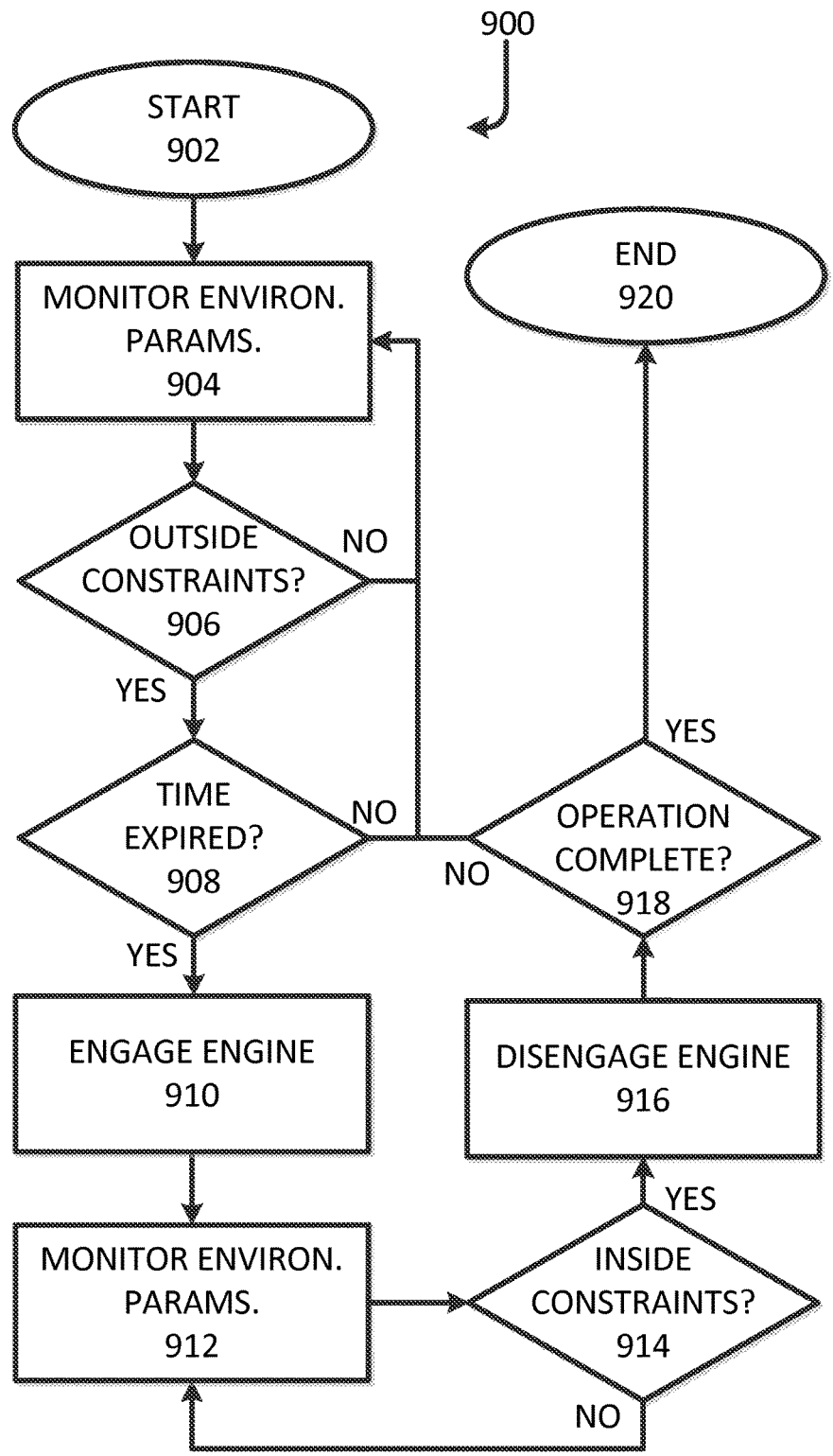
FIG. 9 is a flow diagram of another methodology for controlling environmental parameters in an environmentally controlled electrode storage compartment.

FIG. 9 illustrates another methodology 900 for maintaining storage constraints within an environmentally controlled electrode storage compartment. Methodology 900 begins at 902 and proceeds to 904 where environmental parameters associated with the environmentally controlled electrode storage compartment are monitored. Monitoring can occur in an ongoing, real-time fashion, or based on periodic audits to preserve energy or based on device capability. At 906 a check is performed to determine if one or more of the environmental parameters being monitored are outside the storage constraints (e.g., above or below point value, beyond prescribed range, past a threshold). If the determination at 906 returns negative, methodology 900 recycles to 904 where monitoring continues.

If the determination at 906 returns positive, a further check is performed at 908 to determine if a time has expired. For example, electrodes may be safely stored outside the prescribed storage constraints for a period of time without substantial degradation. Therefore, after determining that the storage constraints have been violated, a period of time may be permitted to toll before taking corrective action. The period of time may be fixed (e.g., one hour) or variable (e.g., dependent on electrode type, amount deviation from storage constraints, rate of change of environmental parameters, et cetera). If the period of time has not expired, methodology 900 returns to 904 where monitoring continues.

If the period of time has expired in 908, the engine is engaged at 910 and a process for influencing the environmental parameters back into accord with the storage constraints is begun. Thereafter at 912, the parameters are monitored to evaluate when the environmental parameters are brought into conformance with the storage constraints. At 914, methodology 900 performs a check as to whether the process initiated at 910 has brought the environmental parameters into accord with the storage constraints. If, at 914 it is determined that the environmental parameters remain outside the storage constraints, methodology 900 returns to 912 and monitoring continues.

If the determination at 914 returns positive, methodology 900 proceeds to 916 where the engine is disengaged (or the control process associated with the engine is ceased in the event the engine is still running in support of a welding operation). Thereafter, a determination is made at 918 to resolve whether the operation maintaining storage constraints is complete. If the operation is incomplete, methodology 900 returns to 904 where monitoring of the environmental parameters continues. However, if the operation is complete, methodology 900 proceeds to terminate at 920.

Figure 10:
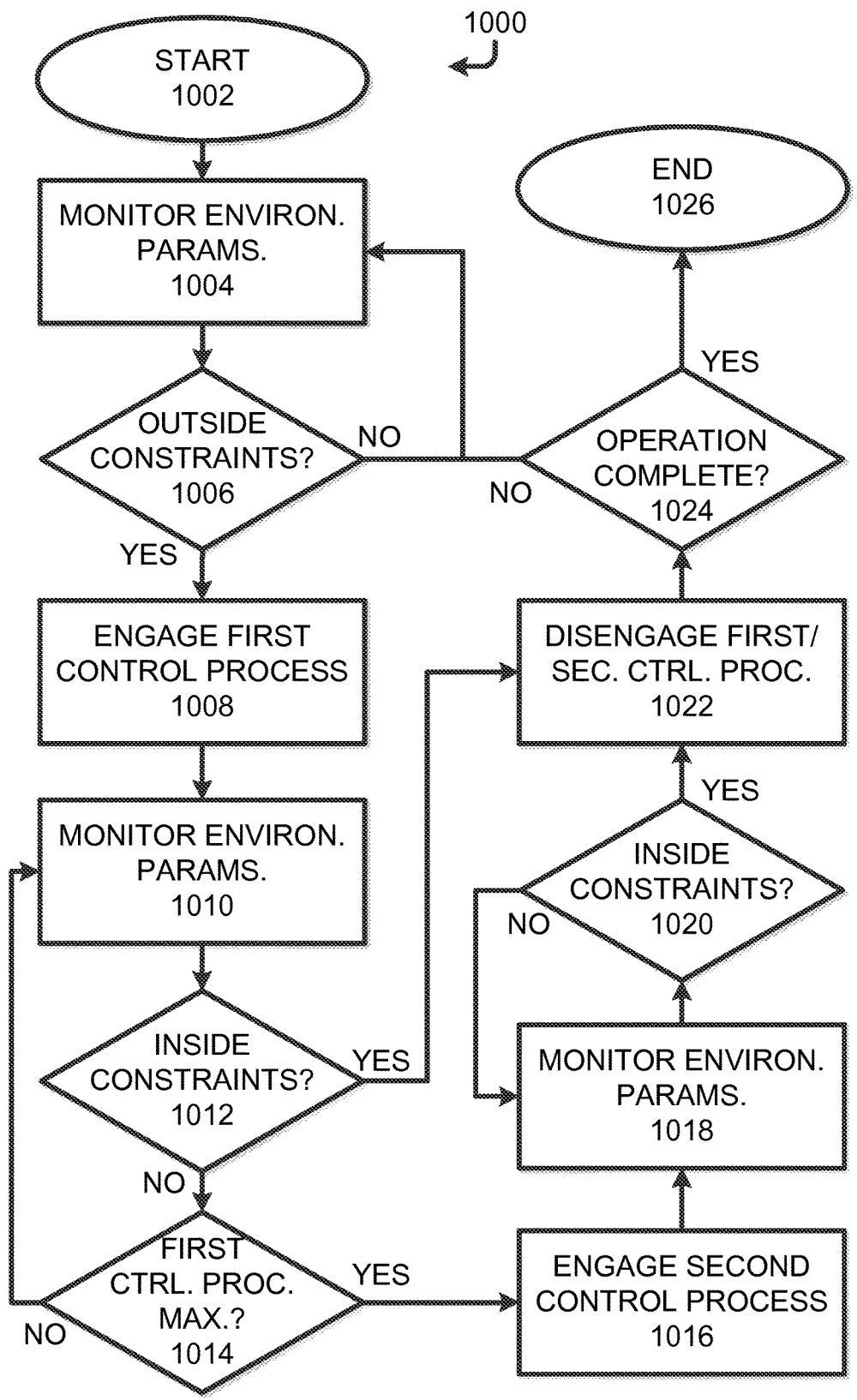
FIG. 10 is a flow diagram of a further methodology for controlling environmental parameters in an environmentally controlled electrode storage compartment.

Regarding FIG. 10, illustrated is a methodology 1000 for controlling environmental parameters in an environmentally controlled electrode storage compartment. Methodology 1000 starts at 1002 and proceeds to 1004 where environmental parameters associated with the environmentally controlled electrode storage compartment are monitored. Monitoring can occur in an ongoing, real-time fashion, or based on periodic audits to preserve energy or based on device capability. At 1006 a check is performed to determine if one or more of the environmental parameters being monitored are outside the storage constraints (e.g., above or below point value, beyond prescribed range, past a threshold). If the determination at 1006 returns negative, methodology 1000 recycles to 1004 where monitoring continues.

If the determination at 1006 returns positive, a first control process (e.g., engine power for heat exchanger) is engaged at 1008 and a process for influencing the environmental parameters back into accord with the storage constraints is begun. Thereafter at 1010, the parameters are monitored to evaluate when the environmental parameters are brought into conformance with the storage constraints. At 1012, methodology 1000 performs a check as to whether the process initiated at 1008 has brought the environmental parameters into accord with the storage constraints. If, at 1012 it is determined that the environmental parameters remain outside the storage constraints, methodology 1000 proceeds to 1014 where a determination is made to resolve whether the first control process is "maxed," or is otherwise incapable of further influencing the environmental parameters. If the determination at 1014 returns negative, methodology 1000 returns to 1010 and continues monitoring the changes to the environmental parameters.

If the determination at 1014 returns positive, methodology 1000 proceeds to 1016 where a second control process (e.g., electrical generation for electrical control component) is initiated. Thereafter at 1018, the parameters are monitored to evaluate when the environmental parameters are brought into conformance with the storage constraints. At 1020, methodology 1000 performs a check as to whether the process initiated at 1016 has brought the environmental parameters into accord with the storage constraints. If the determination at 1020 returns negative, methodology 1000 returns to 1018 where monitoring of the parameters continues.

If either determination at 1012 or 1020 returns positive, indicating the environmental parameters have been brought back into accord with the storage constraints, methodology 1000 proceeds to 1022 where one or both of the first and second processes for controlling the environmental parameters is disengaged. In the event one of these processes is reliant on functioning of an engine which is also contributing to power generation in support of a welding process, methodology 1000 may only cease environment parameter control processes, take no action at all, or take no immediate action but remove a control signal to continue control processes even in lieu of a welding operation.

Thereafter, a determination is made at 1024 to resolve whether the operation maintaining storage constraints is complete. If the operation is incomplete, methodology 1000 returns to 1004 where monitoring of the environmental parameters continues. However, if the operation is complete, methodology 1000 proceeds to terminate at 1026.

While methodology 1000 is described in terms of a first and second control process, it is understood that various multiples or subsequent control processes can be employed. Further, the processes need not run concurrently at all times, and two or more control processes may be alternated in relation to one another or in an independent, unrelated fashion.

Further, in methodology 1000 and other systems and/or methods herein, it is understood that some control processes may in fact influence environmental parameters improperly. For example, exhaust may be expelled at 200 degrees Fahrenheit while the storage constraints require that an environmentally controlled electrode storage container be maintained at 450 degrees Fahrenheit for two hours. Therefore, it is appreciated that systems and methods herein will account for such in managing control processes. In the example provided, the exhaust may be exchanged to elevate temperature while the environmentally controlled electrode storage compartment is at a temperature below 200 degrees Fahrenheit, at which time exhaust exchange may be disengaged and higher-temperature control processes relied upon exclusively.

While the embodiments discussed herein have been related to the systems and methods discussed above, these embodiments are intended for purposes of example and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit or scope of the above discussed inventions. The embodiments and discussions herein can be readily incorporated into any of these systems and methodologies by those of skill in the art. By way of example and not limitation, a power supply as used herein (e.g., welding power supply, among others) can be a power supply for a device that performs welding, arc welding, laser welding, brazing, soldering, plasma cutting, waterjet cutting, laser cutting, among others. Thus, one of sound engineering and judgment can choose power supplies other than a welding power supply departing from the intended scope of coverage of the embodiments of the subject invention.

While aspects herein have been directed toward the storage of electrodes used in welding operations, it is understood that one or more compartments may be configured for storage of other material. Further, while specific types of exchangers are discussed in terms of harnessing products or byproducts for environmental control, those of skill in the art will appreciate other sources (e.g., other components of welding systems that generate heat through use) of energy which can be repurposed for controlling environmental parameters. Further, while portions of this disclosure are directed toward heating or reducing moisture, such aspects are described as possible embodiments presenting descriptive examples, and should not be interpreted as exhaustive or required. Other parameter control procedures including humidifying, cooling, and so forth can be utilized herein without departing from the scope or spirit of the innovation. In at least one embodiment, at least a portion of an environmentally controlled electrode storage compartment can intentionally contain a substance which modifies the characteristics of stored electrodes to prepare the electrode for operation, or facilitate the manifestation of particular characteristics in its use.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims. Obviously, modifications and alterations will occur to others upon the reading and understanding of the specification. It is intended to include all such modifications and alterations insofar as they come within the scope or spirit of the appended claims, or the equivalents thereof.

What is claimed is:

1. An engine driven welding system, comprising:
   an engine of the engine driven welding system that drives a rotor of a rotor-stator assembly generating electrical energy used in a welding operation;
   an environmentally controlled electrode storage compartment configured to enclose one or more electrodes used in the welding operation, wherein the environmentally controlled electrode storage compartment is heated by at least one of combustion exhaust from the engine and coolant from the engine;
   an electrode storage compartment sensor that detects one or more environmental parameters within the environmentally controlled storage compartment;
   an engine controller that selectively controls at least one engine operation parameter based at least in part on the one or more environmental parameters; and
   an environmental control component that controls the one or more environmental parameters within the environmentally controlled electrode storage compartment at least in part using the at least one engine operation parameter.

2. The engine driven welding system of claim 1, further comprising a timer component that tracks a storage duration of the one or more electrodes in the environmentally controlled electrode storage compartment under the one or more environmental parameters.

3. The engine driven welding system of claim 1, further comprising one or more electrode holders within the environmentally controlled electrode storage compartment.

4. The engine driven welding system of claim 1, further comprising a heat exchanger that receives at least byproduct heat of the engine which is operatively coupled with the environmental control component.

5. The engine driven welding system of claim 1, further comprising an electric heater of the environmental control component operatively coupled with the environmentally controlled electrode storage compartment.

6. The engine driven welding system of claim 5, wherein the electric heater is powered at least in part by the electrical energy generated by the rotor-stator assembly.

7. The engine driven welding system of claim 6, wherein the electric heater is powered at least in part by one or more batteries.

8. The engine driven welding system of claim 1, wherein the engine controller calculates a maximum temperature.

9. The engine driven welding system of claim 1, wherein the engine controller adjusts an engine throttle based on the one or more environmental parameters within the environmentally controlled storage compartment.

10. The engine driven welding system of claim 1, wherein the one or more electrodes include at least one low-hydrogen consumable electrode.

11. The engine driven welding system of claim 1, wherein the one or more electrodes include at least one cellulosic electrode.

12. The engine driven welding system of claim 1, further comprising an electrode type sensor that detects a type of electrode stored in the environmentally controlled electrode storage compartment, wherein the environmental control component controls the one or more environmental parameters within the environmentally controlled electrode storage compartment based on the detected type of electrode.

13. The engine driven welding system of claim 1, wherein the electrode storage compartment sensor is a humidity sensor that detects humidity within the environmentally controlled storage compartment.

14. An engine driven welding system, comprising:
   an internal combustion engine that drives a rotor of a rotor-stator assembly generating electrical energy used in a welding operation;

an environmentally controlled electrode storage compartment configured to enclose one or more electrodes used in the welding operation, wherein the environmentally controlled electrode storage compartment is heated by at least one of combustion engine exhaust from the internal combustion engine and coolant from the internal combustion engine;

an electrode storage compartment sensor that detects one or more environmental parameters within the environmentally controlled storage compartment; and a controller that engages the internal combustion engine, disengages the internal combustion engine, or adjusts an engine throttle of the internal combustion engine based on the one or more environmental parameters within the environmentally controlled storage compartment, to thereby control the one or more environmental parameters within the environmentally controlled electrode storage compartment.

15. The engine driven welding system of claim 14, further comprising an electrode type sensor that detects a type of electrode stored in the environmentally controlled electrode storage compartment, wherein the controller controls the one or more environmental parameters within the environmentally controlled electrode storage compartment based on the detected type of electrode.

16. The engine driven welding system of claim 14, wherein the electrode storage compartment sensor is a humidity sensor that detects humidity within the environmentally controlled storage compartment.

17. The engine driven welding system of claim 14, further comprising a timer component that tracks a storage duration of the one or more electrodes in the environmentally controlled electrode storage compartment under the one or more environmental parameters.

* * * * *